United States Patent [19]
Haneda et al.

[11] Patent Number: 5,434,837
[45] Date of Patent: Jul. 18, 1995

[54] METHOD OF TESTING A WORM TYPE OPTICAL DISK AND SYSTEM THEREFOR

[75] Inventors: Norihisa Haneda; Eiji Yoshimatsu, both of Asaka, Japan

[73] Assignee: Fuji Photo Film Co., Ltd., Japan

[21] Appl. No.: 105,167

[22] Filed: Aug. 12, 1993

[30] Foreign Application Priority Data

Oct. 19, 1992 [JP] Japan ................... 4-279855
Jun. 10, 1993 [JP] Japan ................... 5-138059

[51] Int. Cl.$^6$ ............................................. G11B 7/00
[52] U.S. Cl. ................................... 369/54; 369/58; 369/32
[58] Field of Search ............... 369/54, 58, 47, 48, 369/50, 32

[56] References Cited

U.S. PATENT DOCUMENTS

| | | | |
|---|---|---|---|
| 4,210,735 | 5/1993 | Hoshino et al. | 369/54 |
| 4,519,058 | 5/1985 | Tsurushima et al. | 369/54 |
| 4,686,563 | 8/1987 | Fountain et al. | 369/54 |
| 4,835,757 | 5/1989 | Abiko | 369/54 |
| 4,901,301 | 2/1990 | Senshu | 369/54 |
| 4,969,139 | 11/1990 | Azumatani et al. | 369/54 |
| 5,124,963 | 6/1992 | Ando | 369/54 |
| 5,274,617 | 12/1993 | Terashima et al. | 369/54 |

FOREIGN PATENT DOCUMENTS 5159507 6/1993 Japan.
5182199 7/1993 Japan.

Primary Examiner—Georgia Y. Epps
Assistant Examiner—P. W. Huber

[57] ABSTRACT

A medium testing method capable of testing a WORM (Write Once Read Memory) type optical disk efficiently and accurately, and a system for practicing the method. A playback unit plays back a disk to output a radio frequency (RF) signal representative of data stored therein. As the RF signal is routed through an RF amplifier to an error detecting unit, the detecting unit decodes the signal frame by frame and detects correctable errors and uncorrectable errors while correcting the errors of each frame. A track information detecting unit reads track information out of lead-in areas and outputs them. An error processing unit determines gaps between consecutive tracks by calculation on the basis of the track information. Subsequently, the error processing unit removes errors lying in the gaps from the error information received from the error detecting unit. Consequently, only the errors lying in the areas storing valid data, as distinguished from the gaps between tracks and gaps between sessions, are used to evaluate the disk. This allows only the substantial defects of the optical disk to be detected. The result of the test is written to an exclusive storage.

6 Claims, 6 Drawing Sheets

METHOD OF TESTING A WORM TYPE OPTICAL DISK AND SYSTEM THEREFOR

BACKGROUND OF THE INVENTION

1. Field of the Invention

The present invention relates to a method of testing a recording medium implemented as a WORM (Write Once Read Memory) type optical disk, and a system for practicing it. More particularly, the present invention is concerned with a method of testing a WORM type optical disk which allows high resolution picture data derived from, for example, negative films of silver halide sensitive type of photography to be sequentially recorded therein, and a system for practicing it.

2. Description of the Related Art

Today, a photo CD (Compact Disk) system is in development in which picture data are produced from, for example, films of silver halide sensitive type of photography brought by a user to a service station and then recorded in a compact disk or similar optical disk. Picture data derived from the above-mentioned kind of films have a resolution more than several ten times as high as the resolution of picture data available with other electronic recording systems, e.g., picture data output by an electronic still camera. Various approaches have been reported for recording the picture data derived from the films in an optical disk which is a miniature and large capacity recording medium, and reproducing them later, e.g., transferring them from the disk to a computer or similar processing device.

Specifically, in the photo CD system, a film scanner or similar reading device sequentially reads a plurality of picture data out of, for example, a 35 millimeters negative film. The picture data are then edited by a picture processing device, e.g., a computer for editing pictures. Finally, the edited picture data are sequentially recorded, one frame at a time, in a WORM type compact disk by a CD writer or similar recording device.

It is a common practice with a WORM type compact disk to form an intermittent guide groove, or pregroove as generally referred to, in a spiral configuration from the innermost part to the outermost part of the disk beforehand. Data are recorded in the disk along the pregroove track by track. Assume that plural frames of picture data produced from, for example, a 24-shot negative film are recorded in the disk as a unit which is generally referred to as a session. Then, in the area of a single session, a header and a subheader storing the contents of picture data to be recorded together with a reproduction program are formed in a single track, and then a plurality of tracks storing two or three frames of picture data are formed one after another. A lead-in track and a lead-out track indicative of the beginning and the end of the session, respectively, are written in the disk on opposite sides of the data area. Specifically, the lead-in track stores the recording conditions of the consecutive tracks constituting the session, e.g., the number of tracks, time information representative of the start and end addresses of each track in terms of minutes and seconds, and track information usually referred to as a table of contents (TOC).

After all the sessions have been recorded in the disk, the disk is tested to see if the data and information have been accurately recorded. If the disk is free from defects, it is handed over to the user. If the disk is defective, defects are corrected in a new disk or in the same disk if they are correctable, and then the disk is handed over to the user. A testing device or a recording device designed for rewriting data is disclosed in Japanese Patent Laid-Open Publication No. 159507/1993 or Japanese Patent Application No. 346392/1991 applied for by the same assignee as the present application. The disk once handed over to the user may again be brought to the service station together with a newly exposed negative film. Then, the pictures of the new film will be additionally written to the disk session by session after the previously recorded sessions while being spaced apart from the latter by a predetermined gap.

The conventional procedure described above has the following problem. Since additional picture data are sequentially recorded in a compact disk in consecutive groups of sessions, it is likely that the gap separating, among-others, nearby sessions has an indefinite length or that the picture data overlap at the point where the sessions join. Then, uncorrectable errors occur between nearby sessions in the event of a test. It is impossible to determine whether the uncorrectable errors are ascribable to the physical defects of the disk or the defects of recorded data or whether they are ascribable to the juncture of nearby sessions. Uncorrectable errors occur even when the disk and recorded data both are free from defects. Therefore, it often occurs that all the sessions recorded in one disk have to be recorded in another disk all over again.

SUMMARY OF THE INVENTION

It is, therefore, an object of the present invention to provide a medium testing device capable of accurately testing an optical disk storing picture data by distinguishing defects ascribable to the juncture of the preceding data and following data from the physical defects of the disk, and a system for practicing it.

A medium testing system of the present invention is applicable to a WORM type optical disk Containing a plurality of tracks each storing data, and track information indicative of positions of the plurality of tracks. The tracks are sequentially written in the disk in a spiral from the innermost portion to the outermost portion of the disk while being spaced apart by gaps. The system comprises a track information detecting unit for reading particular areas of the disk where the track information are recorded to thereby detect the number of tracks stored in the disk and the start position and end position of each of the tracks, a gap position detecting unit for detecting the positions of the gaps on the basis of the track information read by the track information detecting unit, an error detecting unit for reading the entire recording area of the disk to detect defective portions of the entire recording area with regard to playback, and a deciding unit for removing the defective portions lying in the positions of the gaps detected by the gap position detecting unit from the defective portions detected by the error detecting unit, and determining the remaining defective portions to be the error portions of the disk.

Also, a medium testing method of the present invention is applicable to a WORM type optical disk containing at least one track storing data and tracks storing track information indicative of a position of the track which are sequentially written in the disk in a spiral from the innermost portion to the outermost portion of the disk while being spaced apart by gaps. The method comprises the steps of (a) reading particular areas of the disk where the track information are recorded to thereby detect the number of tracks stored in the disk and the start position and end position of each of the tracks, (b) detecting the positions of the gaps on the basis of the track information, (c) reading the entire recording area of the disk to detect defective portions of the entire recording area with regard to playback, and (d) removing the defective portions lying in the positions of the gaps detected in step (b) from the defective portions detected in step (c), and determining the remaining defective portions to be the error portions of the disk.

BRIEF DESCRIPTION OF THE DRAWINGS

The objects and features of the present invention will become more apparent from the consideration of the following detailed description taken in conjunction with the accompanying drawings in which.

DESCRIPTION OF THE PREFERRED EMBODIMENT

Figure 1:
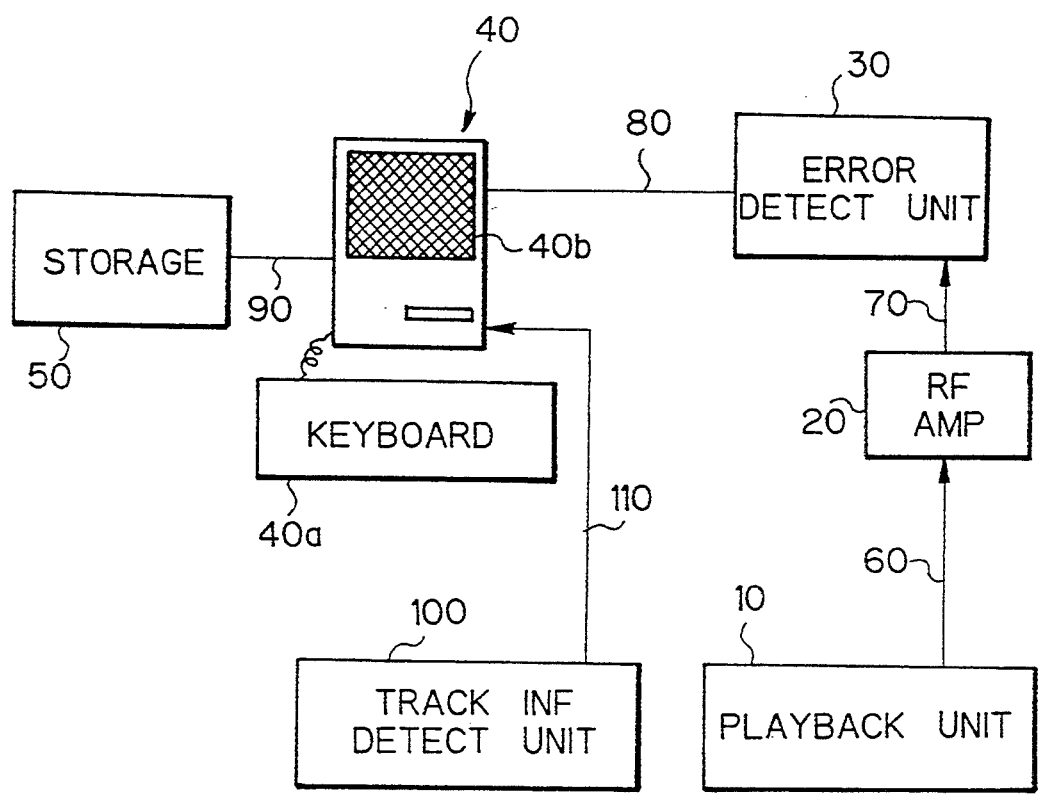
FIG. 1 is a block diagram schematically showing a medium testing system embodying the present invention and applicable to a WORM type optical disk.

Referring to FIG. 1 of the drawings, a medium testing system embodying the present invention is shown which is applicable to WORM type optical disks. As shown, the system is generally made up of a playback unit 10, an RF (Radio Frequency) amplifier 20, an error detecting unit 30, an error processing unit 40, an external storage 50, and a track information detecting unit 100. In the illustrative embodiment, to test an optical disk, the track information detecting unit 100 detects track information out of the disk, and then the playback unit 10 reproduces data from the entire surface of the disk. The playback unit 10 has an output terminal thereof connected to the input terminal of the RF amplifier 20 by a cable 60. The RF amplifier 20 in turn has an output terminal thereof connected to the error detecting unit 30 by a cable 70. The error detecting unit 30 and error processing unit 40 are connected to each other by a GP-IB (General Purpose-Interface Bus) 80. The error processing unit 40 arid track information detecting unit 100 are connected by an SCSI (Small Computer System Interface) cable 110. Likewise, the error processing unit 40 and external storage 50 are connected by another SCSI cable 90.

The playback unit 10 is implemented as a CD player having an optical pickup which faces, but does not contact, the surface of a compact disk spinning at high speed. The pickup reproduces data out of the disk as an RF signal. Usually, a CD player is constructed such that it scans, as soon as a compact disk is loaded thereon, the disk to detect track information out of the disk, remains in a standby state, and then starts playing back the disk when, for example, a play button is pressed. However, the illustrative embodiment is advantageously practicable with a CD player which is modified to omit such a conventional procedure so as to continuously play back a so-called multisession optical disk having a plurality of tracks recorded in a plurality of groups or sessions. Specifically, in a multisession optical disk, track information, i.e., lead-in areas exist which are associated one-to-one with the consecutive sessions. After the lead-in areas of the disk have been detected, the playback of the disk is once stopped. Therefore, to allow an ordinary CD player to continuously play back this kind of disk, the embodiment omits the temporary stopping function to be executed after the detection of lead-in areas and has a function of continuously scanning the entire surface of multisessions.

Figure 2:
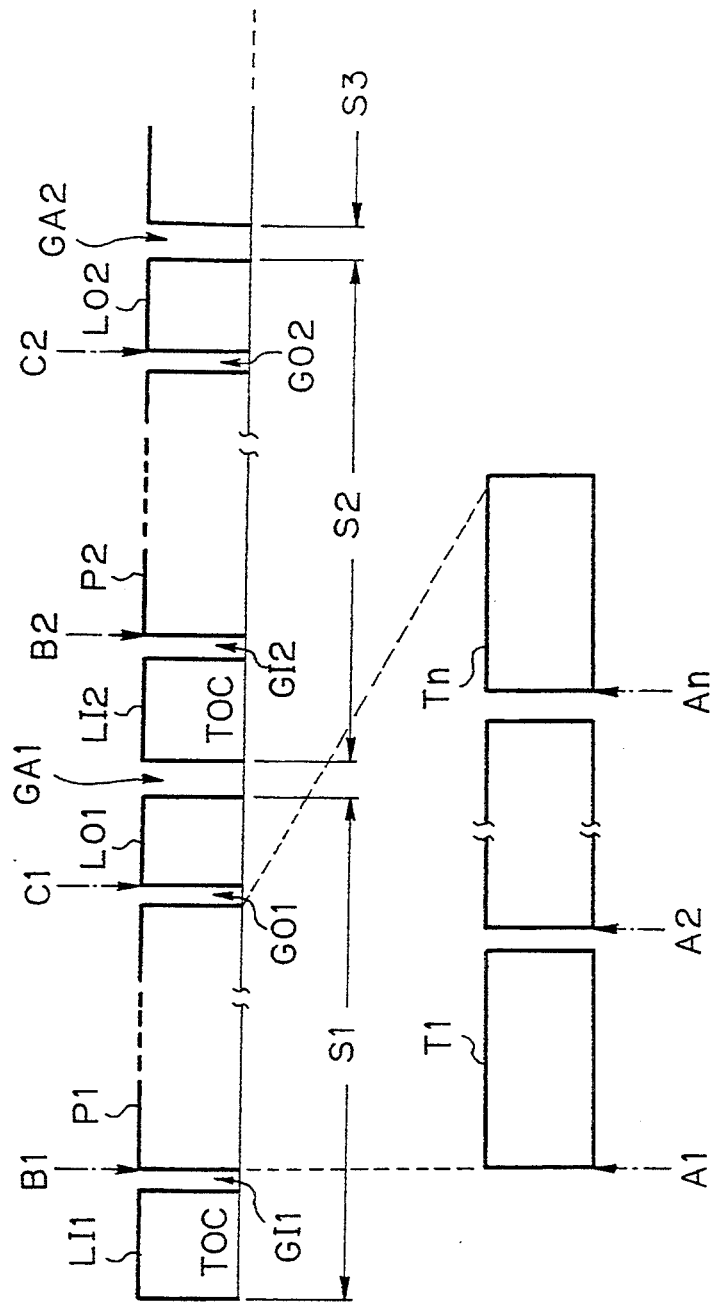
FIG. 2 shows a format particular to a compact disk with which the embodiment is practicable.

FIG. 2 is a view schematically showing a compact disk to be loaded on the playback unit 10. Implemented as a WORM type compact disk, the disk is formed with a pregroove in a spiral and intermittent configuration, although not shown in the figure. Tracks each storing respective data are formed along the pregroove in such a manner as to allow data to be additionally written thereto. The WORM type compact disk has many multisessions although only three multisessions S1, S2 and S3 are shown in the figure. The multisessions S1 and S2, for example, are respectively made up of lead-in areas LI1 and LI2, program areas P1 and P2, and lead-out areas LO1 and LO2. This is also true with the other multisessions. In this embodiment, each session may be regarded as a unit area storing data of a single recording, e.g., picture data of a single 24 or 36 shots film. The lead-in areas LI1 and LI2 are respectively recorded before the program areas P1 and P2 and spaced apart from the latter by predetermined gaps GI1 and GI2, respectively. Let the following description concentrate on the session S1 having the lead-in area LI1, gap GI1, program area P1, and lead-out area LO1 for the sake of simplicity.

In the program area P1, picture data derived from, for example, a 35 millimeters negative film of silver halide sensitive type of photography are written in one or more consecutive tracks. The program area P1 is headed by a single track including a so-called directly area storing the contents, attributes and other information associated with the picture data, a playback program for reproducing the directly area, etc. Hence, the program area P1 includes at least two tracks in total. This is also true with the other program areas P2 and onward.

The lead-in area LI1 preceding the program area P1 and spaced apart from the latter by the gap GI1 stores so-called TOC (Table Of Contents) information outlining the contents of the tracks recorded in the session S1. Specifically., the TOC information mainly consists of the number of tracks recorded in the session S1, and track information representative of the start address and playback time of each track in, for example, minutes and seconds. For example, the lead-in area LI1 contains the start addresses A1-An of consecutive tracks T1-Tn included in the program area P1 as well as the start address C1 of the associated lead-out area LO1. In addition, the lead-in area LI1 stores the start address B2 of the program area P2 included in the next session S3. Specifically, the lead-in area of each session stores the start address of the program area of the following session as well. When additional picture data should be written to the disk later, the start address B2 is referenced to form a predetermined gap GA1 between the consecutive sessions S1 and S2 at the time of next recording. In the figure, labeled GA2 is the gap formed between the session S2 and S3 in the same manner as the gap GA1. However, the problem is that the consecutive sessions S1, S2, S3 and so forth are not always continuously recorded by the same recording apparatus, i.e., the gaps GA1, GA2 and so forth depend on the characteristic of the recording apparatus used. This is apt to bring about errors which cannot be corrected. The illustrative embodiment insures an accurate test by removing such uncorrectable errors, as will be described specifically later.

The lead-out area LO1 of the session S1 follows the program area P1 and is spaced apart from the latter by a gap GO1. In the read-out area LO1, the start position and other information associated with the session S1 are recorded in terms of minutes and seconds, as in the lead-in area LI1. Labeled GO2 is a gap similar to the gap GO1 and separating the program area P2 and lead-out area LO2 of the second session S2. The data described above are subjected to coding inclusive of CIRC (Cross Interleaved Reed-Solomon Code) or similar error correction code, modulated by an EFM (Eight-to-Fourteen Modulation) system, recorded in the tracks, and then sequentially reproduced by the playback unit 10.

Referring again to FIG. 1, the error detecting unit 30 is implemented as a decoder and processes the RF signal received from the playback unit 10 via the RF amplifier 20 so as to detect error values contained therein. Specifically, the error detecting unit 30 includes an EFM signal processing section, an error counting section, a dropout measuring section, and a GP-IB control section, although not shown in the figure specifically. The EFM signal processing section decodes signals frame by frame while correcting errors of the signals by CIRC error correcting code. It is to be noted that the term "frame" refers to the minimum unit of recording and reproduction processing particular to the EFM system. For example, with the Sony-Philips' CD standards, it is possible to record 7,350 frames in a compact disk every second. The error counting section counts correctable data and uncorrectable data of each of the frames corrected by the EFM signal processing section. The resulting counts are output together with position data associated therewith. The dropout measuring section measures, for example, the positions which a DC player cannot track. Since the dropout measuring section does not directly join in the error measurement of the illustrative embodiment, let the following description assume that tracking errors do no occur. The GP-IB control section receives a control signal from the error processing unit 40 over the BP-IB bus 80. In response, the GB-IB control section sets up a particular function and a particular mode in the error detecting unit 30 and outputs measured data, as needed.

Figure 3:
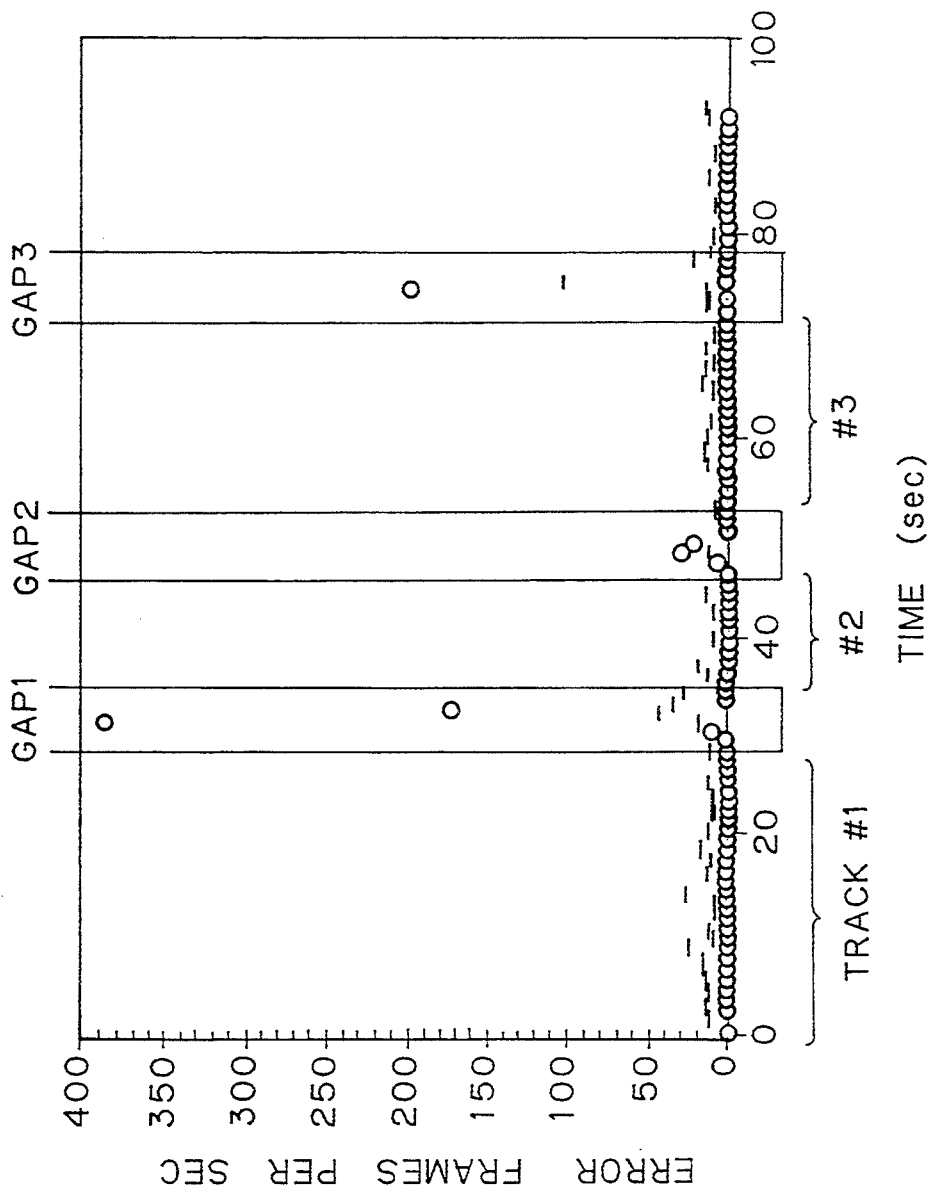
FIG. 3 is a graph representative of specific errors detected by the embodiment.

The error processing unit 40 is constituted by a host computer and controls the error detecting unit 30 to cause it to send the result of error detection covering the entire recording area of the compact disk thereto. On receiving the result of error detection, the unit 40 determines whether or not the compact disk stood the test. The unit 40 is provided with a keyboard 40a and a display 40b which shows the operator the result of error detection. FIG. 3 is a graph showing a specific result of error detection sent from the error detecting unit 30 to the error processing unit 40. As shown, the error values are represented by the numbers of errors of consecutive frames on a second basis. Such errors are counted over substantially the entire area of the compact disk. In FIG. 3, circles are indicative of uncorrectable errors while black marks are indicative of correctable errors, i.e., errors corrected by the error detecting unit or decoder 30. In the illustrative embodiment, as the track information detecting circuit 100 sends track information to the error processing unit 40, the unit 40 removes, among the errors included in the entire recording area and sent from the error detecting unit 30, the uncorrectable errors occurred in the gaps GA1, GA2 and GA3 as indicated by the track information. As a result, the unit 40 determines whether or not each substantial session is acceptable and whether or not the entire compact disk is acceptable.

Specifically, the track information detecting unit 100 sends TOC information, i.e., track information to the error processing unit 40 over the SCSI bus 110. In response, the error processing unit 40 determines the positions of the gaps between the consecutive tracks. The position of each gap is calculated as an absolute period of time representative of a reproduction time as counted from the radially innermost portion of the disk in minutes and seconds. At the same time, the error detecting section included in the error detecting unit 30 sends the error values of the consecutive sessions, i.e., the entire recording area of the disk to the error processing unit 40. Of course, the error values include the results of error detection effected in the gaps between the consecutive tracks. The error values are graphed and displayed on the display 40b, as shown in FIG. 3. Then, among the error values, the uncorrectable error values occurred in the gaps are masked to determine only the valid error values present in the effective recording area of the disk. The error processing unit 40 causes the external storage 50 to record the valid error values and other information therein.

The external storage 50 is an independent storage connectable to the host computer 40 and may advantageously be constituted by a removable drive which allows a disk to be replaced or a photomagnetic disk drive. In the embodiment, all the test data of each compact disk, including the track information and error information output from the error detecting unit 30 to the host computer 40, gap position information calculated by the host computer 40, and masked error information, are recorded in the storage 50.

The track information detecting unit 100 may advantageously be implemented as a CD-ROM (Read Only Memory) driver capable of dealing with multisessions. In the illustrative embodiment, the detecting unit 100 sequentially detects the data stored in the lead-in areas LI1 and onward from the innermost portion to the outermost portion of the compact disk while outputting them as TOC information. Specifically, the detecting unit 100 detects PMINs, PSECs and PFRAMEs of pointers 1–99 representative of the start addresses of the tracks belonging to the consecutive sessions P1 and onward, MINs, SECs and FRAMEs of a pointer B0 representative of the start addresses of the program areas P2 and onward of the following sessions S2 and onward, and PMINs, PSECs and PFRAMES of a pointer A2 representative of the start addresses of the lead-out areas LO1 and onward. The TOC information so read by the detecting unit 100 are sent to the error processing unit 40.

Figure 4:
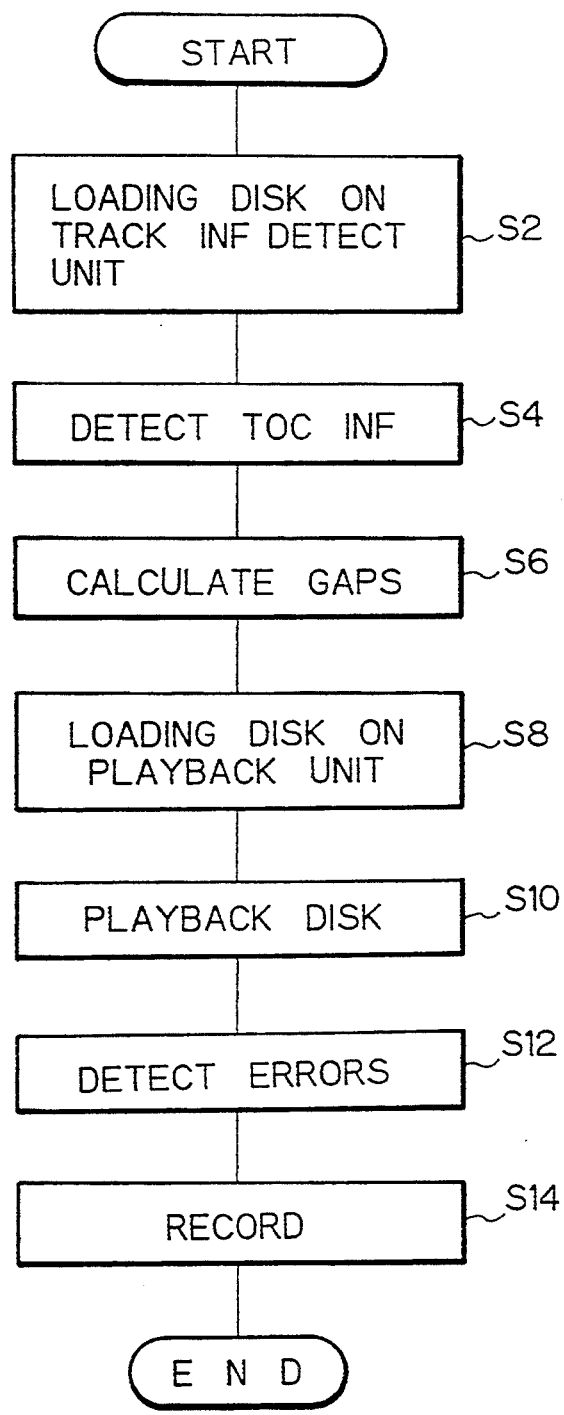
FIG. 4 is a flowchart demonstrating a specific procedure which an error detecting unit included in the embodiment executes for detecting errors out of the disk.

A reference will be made to FIGS. 4–6 for describing a specific procedure which the medium testing system executes to evaluate a WORM type compact disk. Assume that the disk to undergo a test has three sessions recorded therein by way of example. To begin with, as shown in FIG. 4, a compact disk is loaded on the track information detecting unit 100 (step S2). Then, the detecting unit 100 reads TOC information out of the disk while delivering them to the error processing unit 40 (step S4). In response, the error processing unit 40 calculates gaps between the tracks and gaps between the sessions on the basis of the TOC information (step S6). The steps S4 and S6 will be described in detail with reference to FIG. 5.

Figure 5:
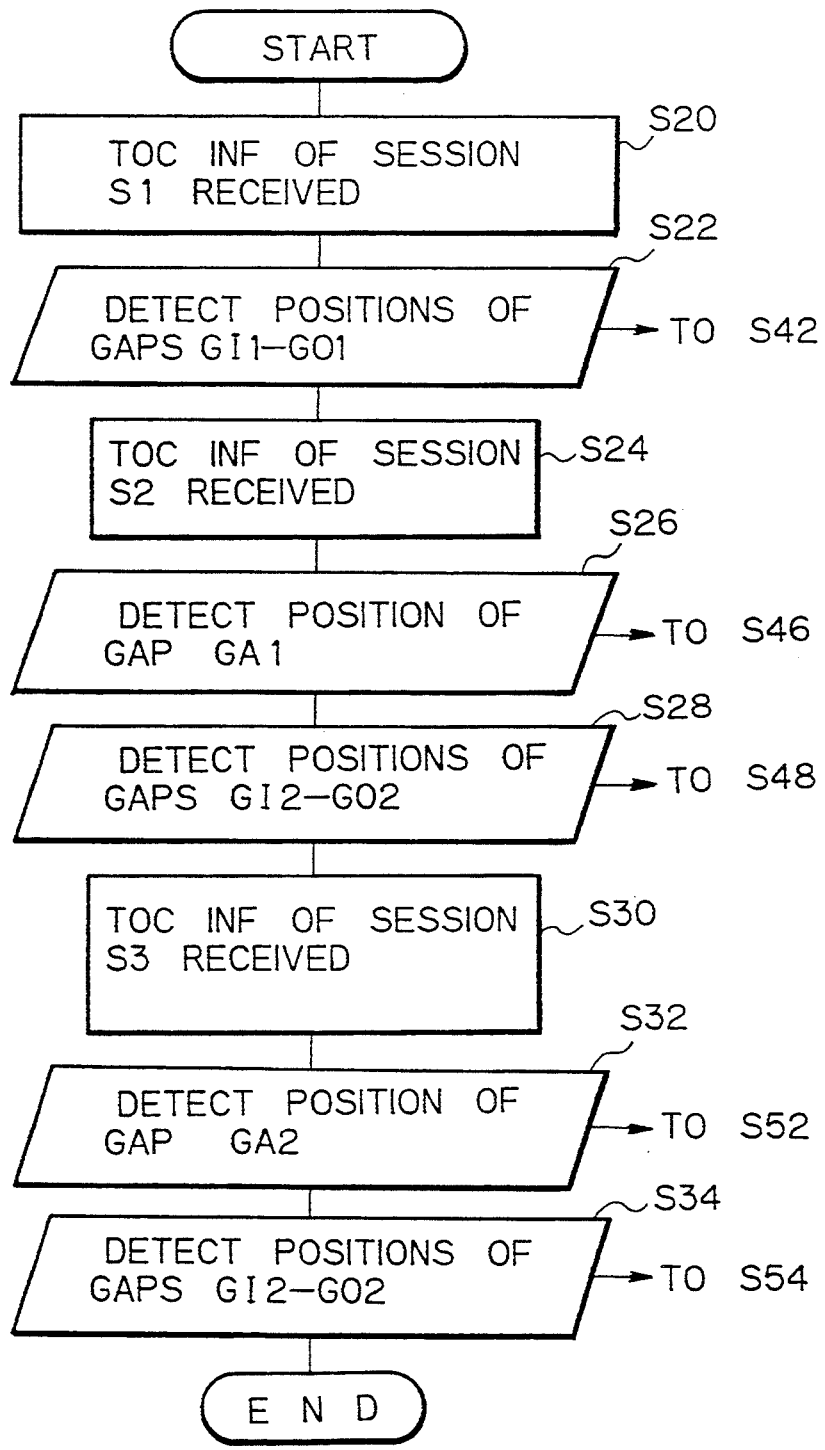
FIG. 5 is a flowchart representative of a procedure in which an error processing unit also included in the embodiment determines gaps formed in the disk.

In the subroutine shown in FIG. 5, the error processing unit 40 receives the TOC information of the first session S1 from the track information detecting unit 100 (step S20). Then, the processing unit 40 calculates the positions of the gaps GI1-GO1 between the consecutive tracks of the first session S1 (step S22). Subsequently, the processing unit 40 receives the TOC information of the second session S2 (step S24) and determines the position of the gap GA1 between the sessions S1 and S2 (step S26). Further, the processing unit 40 determines the positions of the gaps GI2-GO2 between the consecutive tracks of the second session S2 (step S28). Likewise, on receiving the TOC information of the third session (step S30), the processing unit 40 determines the gap GA2 between the sessions S2 and S3 (step S32). Thereafter, the processing unit 40 determines the positions of the gaps GI3-GO3 between the consecutive tracks of the session S3 (step S34). In the illustrative embodiment, when the processing unit 40 detects the position of a gap as stated above, it additionally effects error correction at the leading end and trailing end of the gap in consideration of a write error particular to a track. As a result, each gap is provided with a substantially constant width, e.g., approximately 1.5 seconds in terms of a period of time. Regarding the gap between the sessions, it is preferable to effect further error correction.

Referring again to FIG. 4, after all the gaps of the disk have been determined by the error processing unit 40, the disk is unloaded from the track information detecting unit 100 and then loaded on the playback unit 10 (step S8). Then, the playback unit 10 is operated to continuously play back the entire surface of the disk (step S10). A signal reproduced from the disk is sent to the error detecting unit 30 via the RF amplifier 20. In response, the detecting unit 30 detects errors out of the input signal (step S12). Specifically, the detecting unit 30 decodes the signal from the playback unit 10 while causing the EFM processing section thereof to correct errors frame by frame. Further, the detecting unit 30 causes the error detecting section thereof to classify the results of decoding of the sessions S1 and onward, inclusive of the lead-in areas LI1 and onward, program areas P1 and onward, and lead-out areas LO1 and onward, into correctable errors and uncorrectable errors. The detecting unit 30 delivers such error information to the error processing unit 40. On receiving the error information, the processing unit 40 corrects the error information on the basis of the gap positions determined in the step S6 and then determines whether or not the compact disk is acceptable. How the processing unit 40 evaluates the disk will be described in detail with reference to FIG. 6.

Figure 6:
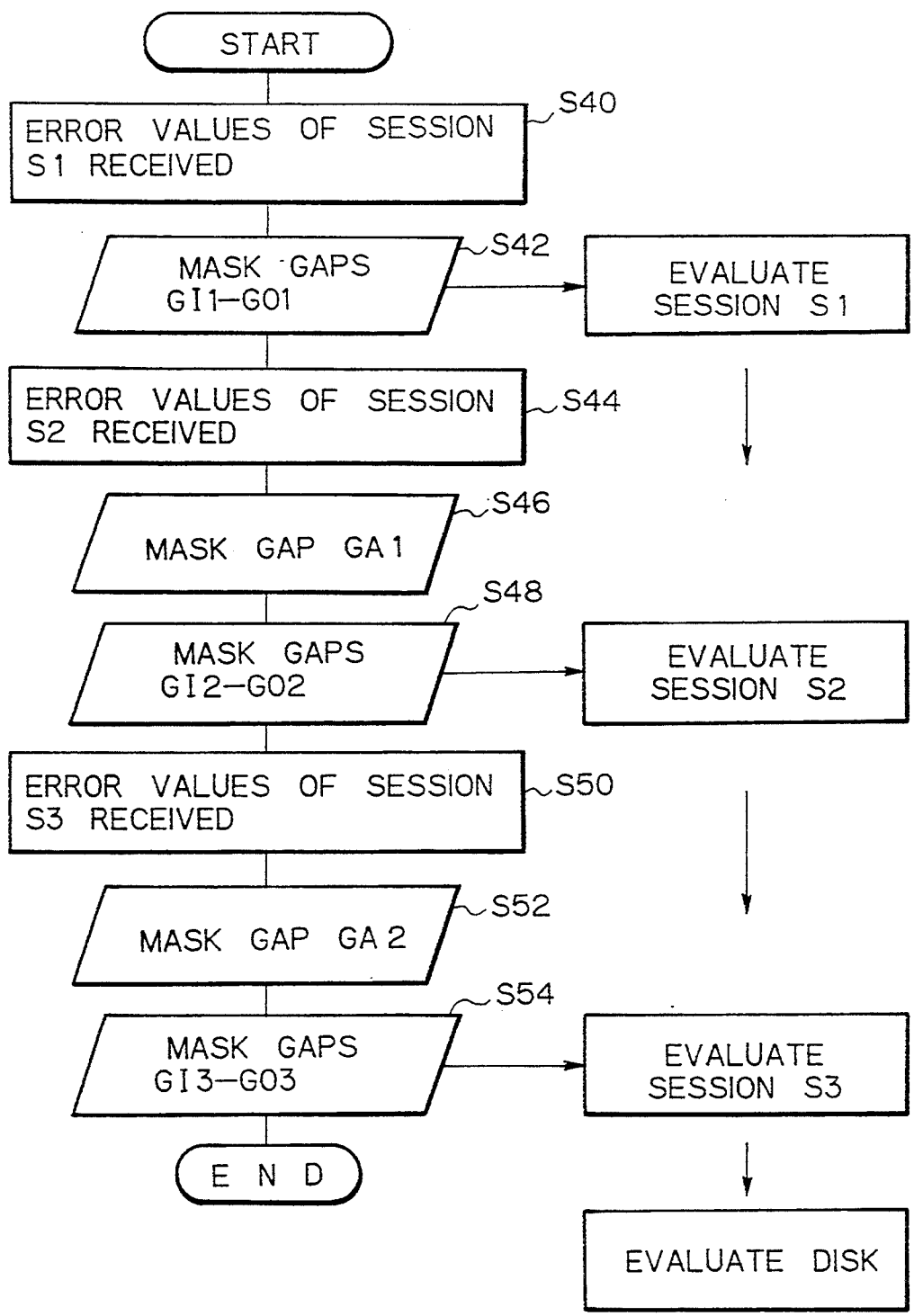
FIG. 6 is a flowchart indicative of how the error processing unit evaluates the disk.

In the subroutine shown in FIG. 6, the error processing unit 40 sequentially receives the error values of the first session S1 from the error detecting unit 30 (step S40). Then, the processing unit 40 masks the error values lying in the gaps GI1-GO1 of the first session S1 as determined in the step S22, FIG. 5 (step S42). As a result, while uncorrectable errors essentially unrelated to the evaluation of the disk are apt to occur in the gaps between the tracks, errors in the gaps are removed by the step S42. Hence, the processing unit 40 determines whether or not the first session S1 is substantially acceptable by detecting only the errors occurred in the tracks.

Subsequently, the processing unit 40 sequentially receives the error values of the second session S2 from the error detecting unit 30 (step S44). Then, the processing unit 40 masks the position of the gap GA1 between the first and second sessions S1 and S2 determined in the step S26, FIG. 5 (step S46). Further, the processing unit 40 masks the gaps GI2-GO2 of the session S2 calculated in the step S28, FIG. 5 (step S48). As a result, the substantial error values of the session S2 are produced and used to see if the session S2 is acceptable. Generally, since the width of the gap GA1 between the first and second sessions S1 and S2 is apt to be indefinite due to additional writing, uncorrectable errors are more likely to occur in such a gap than in the other gaps. In the light of this, the processing unit 40 masks the gap GA1 between the sessions S1 and S2 over a corrected width. It follows that whether or not the session S2 is acceptable can be determined only on the basis of the error values lying in the substantial session S2, i.e., by removing errors from the leading end of the session S2.

Likewise, on receiving the error values of the third session S3 (step S50), the processing unit 40 masks the error values lying in the gap GA2 between the sessions S2 and S3 determined in the step S32, FIG. 5 (step S52). Subsequently, the processing unit 40 masks the error values of the consecutive gaps GI3-GO3 of the session S3 (step S54). As a result, whether or not the session S3 is acceptable is determined. Finally, the processing unit 40 evaluates the entire disk by referencing all the results of decision made on the sessions S1-S3.

Referring again to FIG. 4, the processing unit 40 writes the various information, results of calculation and results of decision described above in the external storage 50 via the SCSI bus 90. Assume that the fourth and successive sessions are additionally recorded in the compact disk afterwards. Then, when the consecutive sessions of the disk, including the additional sessions, are evaluated by the above-described procedure, the results of evaluation will be compared with the contents of the storage 50 to determine, for example, the time when an error occurred due to the additional writing or due to physical damage to the disk or similar cause.

In summary, a medium testing method or system of the present invention detects, when data are written to a WORM type optical disk, track information out of the disk by track information detecting means, determines the gaps between the consecutive tracks by gap detecting means on the basis of the track information, and then removes error values lying in the gaps from error values lying in the entire recording area of the disk. With such a procedure, it is possible to evaluate the disk by using only the error values of the areas other than the gaps between the tracks and where effective information are recorded. This promotes effective and accurate decision on the substantial defective condition of an optical disk of the type concerned.

While the present invention has been described with reference to the particular illustrative embodiment, it is not to be restricted by the embodiment but only by the appended claims. It is to be appreciated that those skilled in the art can change or modify the embodiment without departing from the scope and spirit of the present invention. For example, the embodiment has been shown and described as masking gaps lying in consecutive sessions. Alternatively, when, for example, data are additionally recorded in an optical disk storing data and tested in the past, only the positions of gaps between sessions may be produced and masked. While the embodiment is so constructed and arranged as to store all the information in the external storage 50, only the results of evaluation executed by the error processing unit 40 may be written to the storage 50, if desired. Moreover, the playback unit 10 implemented as a CD player in the embodiment may alternatively be constituted by a CD-ROM driver adaptive to multisessions. Then, the CD-ROM driver, like a CD player, will be provided with an additional function of continuously playing back the entire surface of an optical disk.

What is claimed is:

1. A recording medium inspecting system for inspecting a WORM (Write Once Read Memory) type of optical disk having a plurality of tracks recorded thereon and containing data with track information, indicative of positions of the plurality of tracks, recorded in a particular area of the disk, the plurality of tracks being sequentially written on the disk in a spiral extending from an innermost portion toward an outermost portion of the disk while being spaced apart from each other by gaps, said system comprising:

track information detecting means for reading out the track information from the particular area to thereby identify the number of tracks recorded on the disk, and a start position and an end position of each of the tracks;

gap position detecting means connected to said track information detecting means for detecting positions of the gaps on the basis of the track information read out by said track information detecting means;

error detecting means for reading an entire recording area of the disk to locate defective portions of the entire recording area which are defective in reading out the data recorded on the plurality of tracks; and deciding means connected to said gap position detecting means and said error detecting means for masking portions of the recording area which correspond to the gaps detected by said gap position detecting means from the defective portions located by said error detecting means, and determining a remainder of the defective portions as an erroneous portions of the disk.

2. A system according to claim 1, further comprising recording means for recording at least a result of a decision of said deciding means, said result being referenced in the event of inspecting the disk after data having been additionally written to said disk.

3. A system according to claim 2, wherein said recording means records either information representative of the positions of the tracks, information representative of the positions of the gaps, or error information associated with the entire recording area.

4. A system according to claim 1, wherein the plurality of tracks are recorded in the disk in a plurality of groups which are spaced apart from each other by the gaps, and said deciding means determines the gaps between the plurality of groups and then removes the defective portions lying in said gaps from the defective portions detected by said error detecting means.

5. A medium inspecting method for inspecting a WORM (Write Once Read Memory) type of optical disk having a plurality of tracks recorded thereon and containing data with track information, indicative of positions of the plurality of tracks, recorded in a particular area of the disk, the plurality of tracks being sequentially written on the disk in a spiral extending from an innermost portion toward an outermost portion of the disk while being spaced apart from each other by gaps, said method comprising the steps of:

(a) reading the track information from the particular area to thereby identify the number of tracks recorded on the disk, and a start position and an end position of each of the tracks;

(b) detecting positions of the gaps on the basis of the track information;

(c) reading an entire recording area of the disk to locate defective portions of the entire recording area which are defective in reading out the data recorded on the plurality of tracks; and (d) masking portions of the recording area which correspond to the gaps detected in step (b) from the defective portions located in step (c), and determining a remainder of the defective portions as an erroneous portion of the disk.

6. A method according to claim 5, further comprising the steps of:

(e) recording at least error information of the disk determined in step (d) in a recording means independent of said disk;

(f) referencing said error information when said disk is inspected after additional data have been written to said disk; and (g) updating said error information.

* * * * *